United States Patent [19]
Hill

[11] Patent Number: 5,988,664
[45] Date of Patent: Nov. 23, 1999

[54] APPARATUS FOR TOWING A DISABLED TRUCK TRACTOR

[76] Inventor: John C. Hill, P.O. Box 1495, Moncks Corner, S.C. 29461

[21] Appl. No.: 09/056,131

[22] Filed: Apr. 7, 1998

Related U.S. Application Data

[63] Continuation-in-part of application No. 08/576,757, Dec. 21, 1995, Pat. No. 5,845,920.

[51] Int. Cl.$^6$ ....................................................... B60P 3/06
[52] U.S. Cl. ........................................... 280/402; 414/563
[58] Field of Search ..................... 280/402, 492, 280/493; 414/563, 642, 665, 667, 917

[56] References Cited

U.S. PATENT DOCUMENTS

| | | | |
|---|---|---|---|
| 2,481,223 | 9/1949 | Johnson | 414/563 |
| 3,715,042 | 2/1973 | Rellinger | 414/563 |
| 4,543,030 | 9/1985 | Hawkins | 414/563 |
| 4,708,358 | 11/1987 | Gehman et al. | 280/402 |
| 4,838,753 | 6/1989 | Gehman et al. | 414/563 |
| 5,163,803 | 11/1992 | Marola | 414/563 |
| 5,249,911 | 10/1993 | Marola | 414/563 |

*Primary Examiner*—Kevin Hurley
*Attorney, Agent, or Firm*—Norman B. Rainer

[57] ABSTRACT

A towing apparatus removably attachable to the fifth wheel of a towing vehicle includes a base member having a coupling fixture for the fifth wheel, a forward lifting beam pivotably secured to the base member, and a rear lifting beam pivotably joined to the distal rear extremity of the forward lifting beam. A hydraulically activated piston mechanism is interactive between the two beams to cause the rear lifting beam to swing in a vertical path between a storage state above the towing vehicle and a rearwardly deployed state. In operation, the rear lifting beam, in the deployed state, is joined to the fifth wheel of a disabled tractor vehicle. Further extension of the piston in the same direction of motion causes the rear wheels of the disabled vehicle to rise to permit towing.

13 Claims, 4 Drawing Sheets

APPARATUS FOR TOWING A DISABLED TRUCK TRACTOR

RELATED APPLICATIONS

This application is a continuation-in-part of U.S. patent application Ser. No. 08/576,757, filed Dec. 21, 1995 U.S. Pat. No. 5,845,920.

BACKGROUND OF THE INVENTION

1. Field of the Invention

The present invention relates generally to transporting disabled vehicles and, more particularly, is concerned with a recovery unit for hitching a disabled truck tractor to a towing truck tractor in a manner comparable to normal tractor trailer operations.

2. Description of the Prior Art

In view of the extensive use of truck tractor and trailer rigs in transporting the bulk of good and freight over the nation's highways, it is to be expected that tractor breakdown will be a frequent occurrence. Typically, a disabled tractor has to be removed from the highway to a service facility in order for repairs to be made. Removal normally requires towing the disabled tractor by using a large tow truck specially equipped and dedicated for that purpose. Such tow trucks are expensive, costing in excess of $100,000, and entail high operating costs. In many areas of the country, there are either none available or there may be considerable delay in obtaining the services of one when a breakdown occurs.

There has earlier been disclosed the desirability of temporarily adopting an ordinary truck tractor to perform such towing tasks in addition to its normal use as part of a tractor and trailer rig. The objective is to eliminate the need to locate a dedicated tow truck in order to remove a disabled tractor from the highway to a service facility. The advantage in being able to use another tractor is that such tractors are found with much greater frequency in all parts of the country than are dedicated tow trucks and thus one would quite likely be quickly and conveniently available where the need might arise. Representative hoist and towing mechanisms devised for this purpose are disclosed in U.S. Pat. Nos. 4,047,773 to Parks; U.S. Pat. No. 4,544,175 to Hubert and U.S. Pat. No. 4,708,358 to Gehman, et. al.

The mechanisms disclosed in the aforesaid patents recognize the advantage of employing the fifth wheels on both the towing and towed tractors to achieve a secure coupling of the two vehicles. Such coupling with the fifth wheel has been recognized to impart pivotal mobility necessary for maneuverability of the coupled vehicles during travel. However, the mechanisms of the aforesaid Patents do not readily permit unrestricted pivotal movement at the fifth wheel of the tow tractor. Unrestricted turning movement of a typical fifth wheel is achievable only when said wheel is in a level position, otherwise, binding of rotational movement is experienced. None of the aforesaid patent disclosures are cognizant of this important factor. Additionally, any secondary fulcrum or point of support on the tow tractor other than its fifth wheel inhibits maneuverability.

Earlier towing devices are difficult to deploy for use, often involving the need to carefully position beams or assemblies that may weight as much as 500 pounds. Another requirement of an effective tow device is compactness of storage upon the towing vehicle.

Once the towing tractor is coupled to the disabled tractor, it is necessary to lift the rear portion of the disabled tractor so that it can be pulled in a rearwardly directed manner, riding only upon the front wheels. Such lifting is a formidable task because a tractor may weigh between 15,000 and 20,000 pounds, and a force of about 8,000 pounds is required to raise the rear end of the tractor so that only its front wheels ride on the ground. The aforesaid Gehman, et. al. patent discloses the use of three hydraulic cylinders within a complex framework system to achieve the lifting function. The cylinders must be activated alternatively in a precise order to unfold the unit, and again to lift the tractor. Most of the lifted weight rests upon a fulcrum located behind the rearmost wheels of a tandem axle towing tractor. The placement of excessive weight behind the rear axle or the centerline of tandem rear axles of the towing tractor is undesirable because it lightens the load on the front steering axle of the tractor, thereby causing problems with steering, braking and legal weights per axle. It should also be noted that, in the aforesaid patents, the towing vehicle is of comparable size and weight as the disabled tractor. It would be desirable to utilize a smaller, less expensive towing vehicle to accomplish the lifting and towing mission.

It is accordingly an object of the present invention to provide apparatus for enabling a vehicle having a fifth wheel to tow a disabled tractor vehicle, also having a fifth wheel.

It is another object of this invention to provide apparatus as in the foregoing object which lifts the rear of said disabled vehicle for transporting it rearwardly while rolling on its front wheels.

It is a further object of the present invention to provide apparatus of the aforesaid nature wherein all the lifted weight of said disabled vehicle is borne by the fifth wheel of said towing vehicle.

It is yet another object of this invention to provide apparatus of the aforesaid nature which couples said towing and disabled vehicles by way of their fifth wheels.

It is a still further object of the present invention to provide apparatus of the aforesaid nature which permits jackknifing of said coupled vehicles in a small turning radius.

It is an additional object of this invention to provide apparatus of the aforesaid nature of simple construction amenable to easy, safe operation and low cost manufacture.

These objects and other objects and advantages of the invention will be apparent from the following description.

SUMMARY OF THE INVENTION

The above and other beneficial objects and advantages are accomplished in accordance with the present invention by apparatus removably attachable to the fifth wheel of a towing vehicle, said apparatus comprising:

a) a base member having a floor plate bounded by front and rear edges, paired upwardly directed side plates, and paired securing plates extending rearwardly from said rear edge and equipped with first pivot means, b) a first coupling fixture downwardly directed from said floor plate, c) a forward straight lifting beam elongated between proximal and distal extremities, said proximal extremity being pivotably engaged by said first pivot means, d) a rear lifting beam elongated between first and second extremities, and bounded by upper and lower surfaces, said first extremity being joined by second pivot means to the distal extremity of said forward lifting beam, and said lower surface having adjacent said second extremity a downwardly directed second coupling fixture, e) a leverage post upwardly directed from the upper surface of said rear lifting beam, terminating in an upper extremity, and f) hydraulically activated piston means interactive between a third pivot means associated with said forward lifting beam and a fourth pivot means associated with the upper extremity of said leverage post, said interaction being of a nature to produce powered pivotal movement of said rear lifting beam in a vertical plane.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
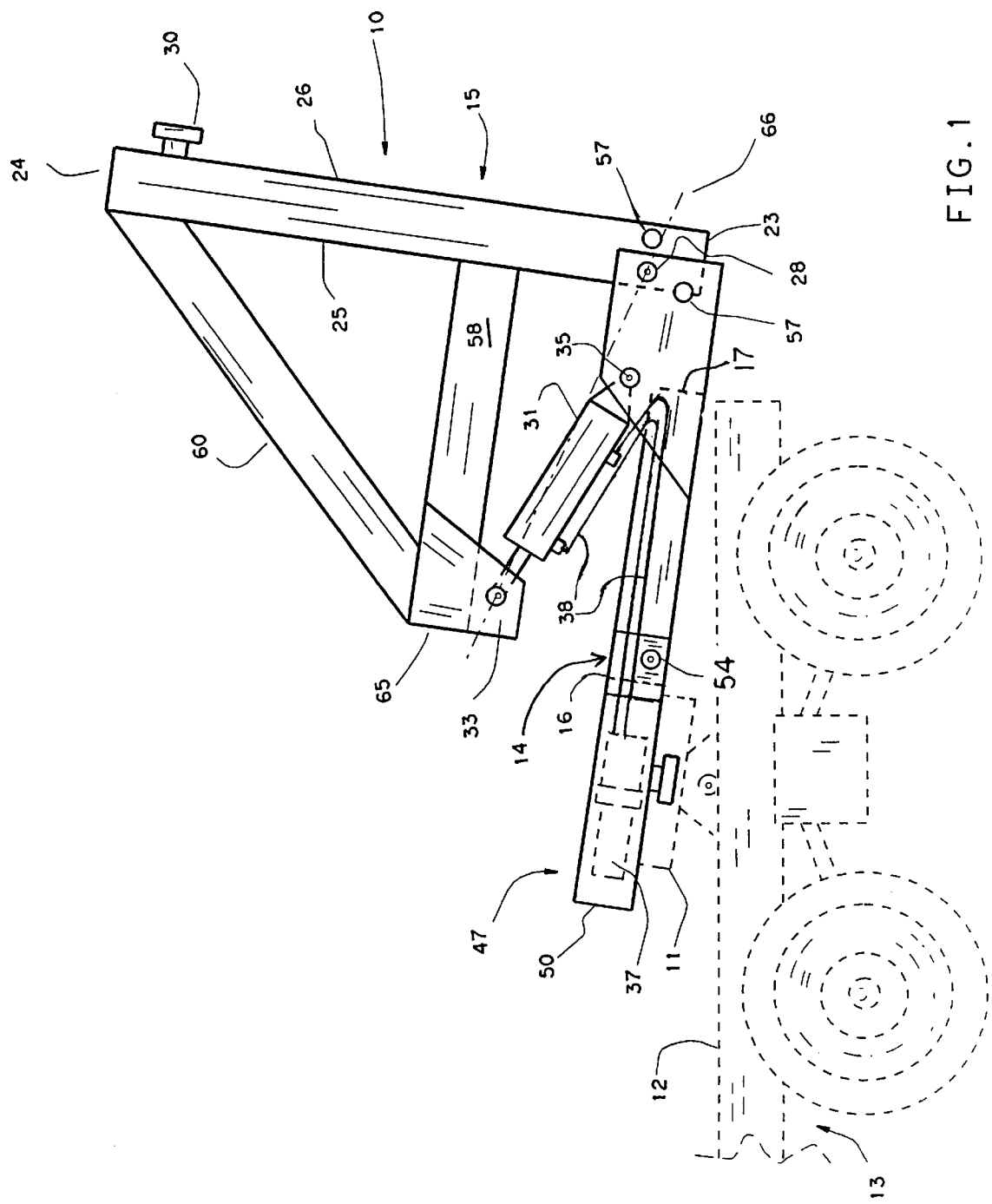
FIG. 1 is a side view of an embodiment of the towing apparatus of the present invention shown in its storage state in functional relationship with a towing vehicle.
Figure 2:
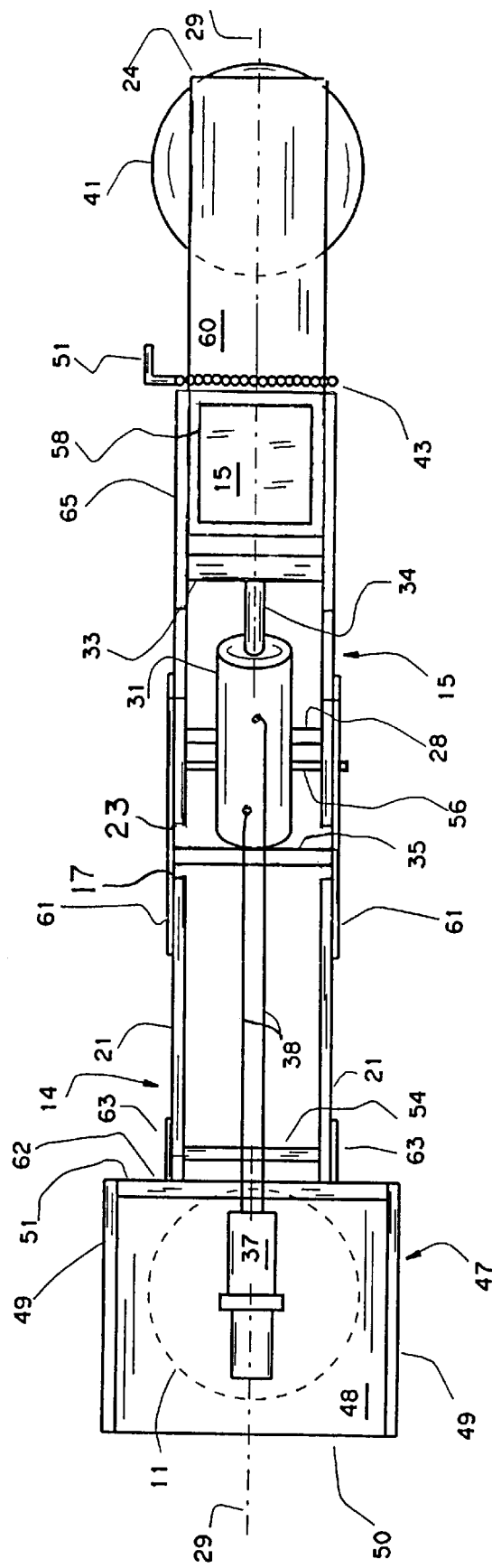
FIG. 2 is a top view of the apparatus in its completely deployed state.

Referring to FIGS. 1–4, an embodiment of the towing apparatus 10 of the present invention is shown mounted in a stored state upon a fifth wheel 11 disposed above the chassis frame 12 of a towing tractor vehicle 13.

Towing apparatus 10 is comprised of base member 47 and forward and rear lifting beams 14 and 15, respectively, said forward lifting beam being elongated between proximal and distal extremities 16 and 17, respectively.

Base member 47 is comprised of rectangular floor plate 48 bounded by front and rear extremities in the form of edges 50 and 51, respectively, and paired upwardly directed side plates 49 which define with said floor plate a structure having an upwardly opening U-shaped contour. In alternative embodiments, a top closure plate may be present, thereby creating a box structure of rectangular cross-sectional configuration. A transverse plate 62 extends upwardly from rear edge 51 in joinder with said side plates. Paired securing plates 63 extend rearwardly from transverse plate 62 in facing vertical disposition. First pivot means in the form of rod 54 is journaled to plates 63 in horizontal disposition. All the aforesaid plates are of steel of ¼ inch to ½ inch thickness, and are joined by welding. A downwardly directed first coupling fixture in the form of kingpin 22 is attached to floor plate 48.

Beam 14 may be of rectangular box-like steel construction, although beams having other configurations such as I and H beams may be employed. Accordingly, the exemplified embodiment of beam 14 may be further characterized as having upper and lower surfaces 19 and 20, respectively, and opposed side surfaces 21. Beam 14 may range in length from about 3 ½ to 4 ½ feet. Said side surfaces may range in width up to 12 inches, as measured orthogonally between said upper and lower surfaces. Beam 14 is attached at its proximal extremity 16 to pivot rod 54. The nature of said pivoted engagement is such as to enable beam 14 to be either axially aligned with said base member or upwardly raised therefrom at an angle up to about 30 degrees.

Figure 4:
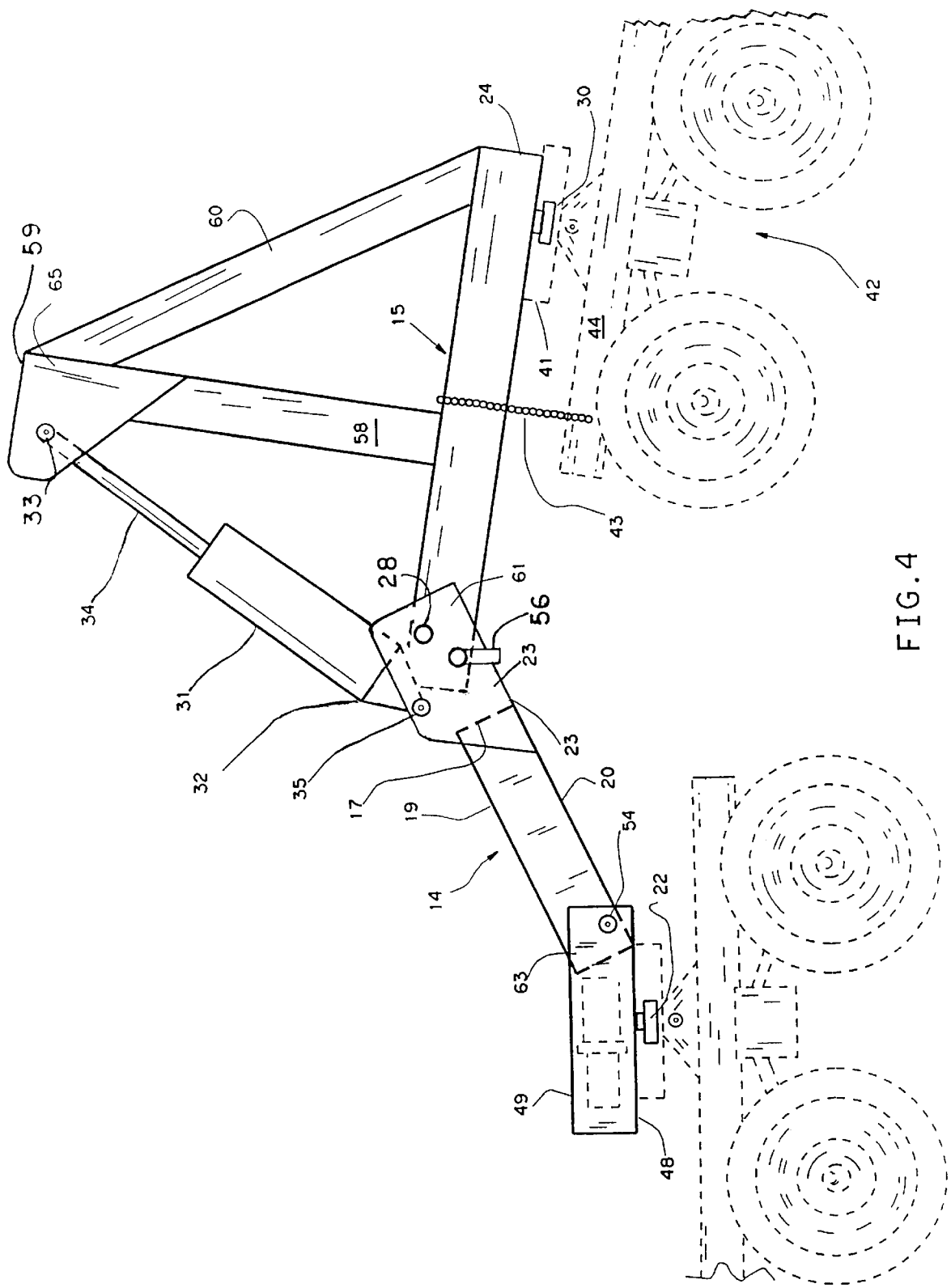
FIG. 4 is a side view of the apparatus in its completely deployed state during towing.

Rear lifting beam 15 is elongated between first and second extremities 23 and 24, respectively, and has upper and lower surfaces 25 and 26, respectively. Said first extremity is joined by way of second pivot means in the form of rod 28 to the distal extremity 17 of said forward lifting beam. In the exemplified embodiment, said distal extremity is shown to have a bifurcated configuration which embraces first extremity 23 of said rear lifting beam for controlled pivotal movement. Such manner of construction also causes the apparatus to have a centered plane of symmetry represented by dashed line 29 in FIG. 2. Paired securing apertures 57 are disposed in beams 14 and 15 at locations which are on a circular arc centered upon pivot rod 28. A removable lock pin 56 is insertable through apertures 57 to lock both lifting beams in their completely deployed, working position, as shown in FIG. 4. A downwardly directed second coupling fixture in the form of kingpin 30 is attached to lower surface 26 adjacent second extremity 24. Rear lifting beam 15 is preferably longer than beam 14.

A leverage post 58 is upwardly directed from the upper surface of rear lifting beam 15, terminating in upper extremity 59. A structurally supporting diagonal beam 60 may be utilized, extending in joinder between upper extremity 59 and second extremity 24 of said rear lifting beam.

A hydraulically activated cylinder 31 is mounted at its closed extremity 32 onto third pivot means in the form of rod 35 secured within first embracing plates 61 welded to beam 14. It is to be noted that pivot rod 35 is located above the upper extremity 19 of beam 14. A piston-driven shaft 34 axially emergent from the opposite extremity of cylinder 31 extends to joinder with the upper extremity of post 58 by way of fourth pivot means in the form of pivot rod 33 secured within second embracing plates 65 welded to the upper extremity of post 58. The exact location of said third and fourth pivot rods, 35 and 33, respectively, is a matter of critical importance. A dashed line denoted by numeral 66 is shown in FIG. 1 to represent a radius of movement of said rear lifting beam, said radius extending between said second and fourth pivot rods 28 and 33, respectively. It has been found that, in order for the apparatus of this invention to function properly, third pivot rod 35 must be located below radius line 63 in the stored state of the apparatus. An electrically driven hydraulic pump 37 may be housed within base member 47. Hydraulic fluid conduits 38 communicate between pump 37 and cylinder 31.

Figure 3:
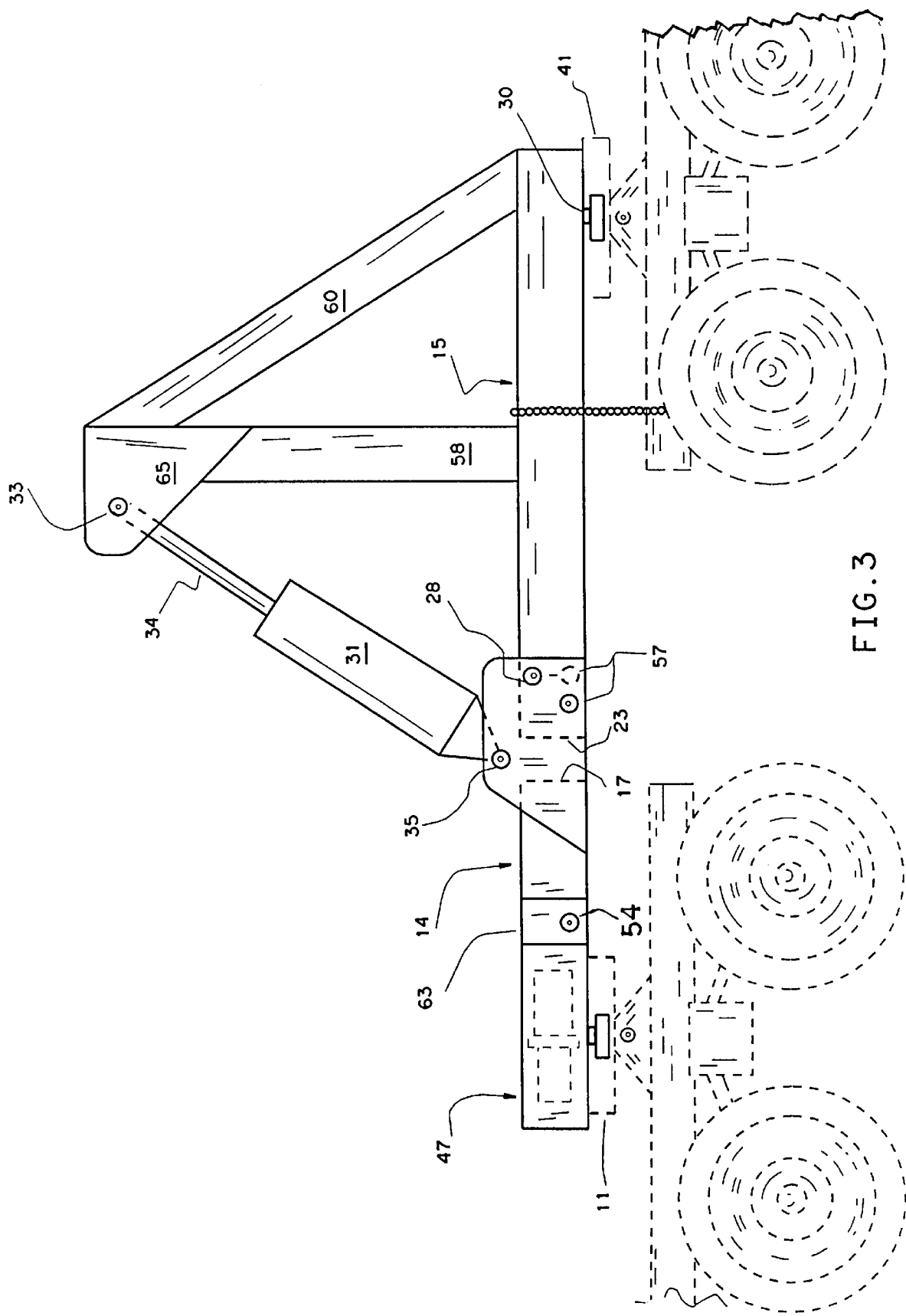
FIG. 3 is a side view which illustrates the initial stage of deployment of the apparatus.

In view of the specialized interaction of the aforesaid components, extension of shaft 34 in a single direction achieves both: a) the lowering of beam 15 from its storage state, as shown in FIG. 1 wherein said second extremity is upwardly directed, to a deployed state, as shown in FIG. 3, wherein said second extremity is rearwardly directed, and b) the lifting of the disabled vehicle, as shown in FIG. 4.

The towing apparatus of this invention is attached by way of kingpin 22 of said forward beam to the fifth wheel of the towing vehicle. In the storage state of the apparatus, rear beam 15 is disposed in an upright position, as shown in FIG. 1.

In use, the towing vehicle is backed up to the rear of the disabled tractor vehicle. The hydraulic pump is activated to cause shaft 34 to emerge from cylinder 31, an action which lowers rear beam 15 to a position where second kingpin 30 can engage the fifth wheel 41 of disabled tractor vehicle 42. One or more chains 43 are then passed beneath the frame 44 of the disabled vehicle and attached to rear beam 15. Chain-engaging hook means 51 may be associated with beam 15 to adjustably hold the chain. The nature of such securement by way of chain 43 is to cause beam 15 and fifth wheel 41 to be parallel to frame 44, while beams 14 and 15 are in linear alignment, as shown in FIG. 3. Emergent movement of shaft 34 is then continued, causing upward movement of the distal extremity of beam 14 and downward movement of the second extremity of beam 15. Such movement causes the lifting of the rear of disabled vehicle 42. The lifting action is continued until the disabled vehicle is in a towing mode with only its front wheels resting upon the ground and the fifth wheel 11 of towing tractor 13 is level with respect to frame 12 of said towing tractor. Lock pin 56 is then inserted, causing rigid unification of said forward and rear beams, said condition being illustrated in FIG. 4. When both vehicles are interconnected by the towing apparatus in the aforesaid manner, full jackknife turning ability is imparted to the coupled vehicles because the fifth wheel of the towing vehicle is able to rotate in its usual manner in a horizontal plane.

It should also be noted that the aforesaid coupling operation is achievable with simplicity and in safe manner. When the towing apparatus is not in use, it may be removed from the towing vehicle.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

Having thus described my invention, what is claimed is:

1. Towing apparatus removably attachable to the fifth wheel of a towing vehicle, said apparatus comprising:
    a) a base member having a floor plate bounded by front and rear extremities, paired upwardly directed side plates, and paired securing plates extending rearwardly from said rear extremity and equipped with first pivot means,
    b) a first coupling fixture downwardly directed from said floor plate,
    c) a forward lifting beam elongated between proximal and distal extremities, said proximal extremity being pivotably engaged by said first pivot means,
    d) a rear lifting beam elongated between first and second extremities, and bounded by upper and lower surfaces, said first extremity being joined by second pivot means to the distal extremity of said forward lifting beam, and said lower surface having adjacent said second extremity a downwardly directed second coupling fixture,
    e) a leverage post upwardly directed from the upper surface of said rear lifting beam, terminating in an upper extremity, and
    f) hydraulically activated piston means interactive between a third pivot means associated with said forward lifting beam and a fourth pivot means associated with the upper extremity of said leverage post, said interaction being of a nature to produce powered pivotal movement of said rear lifting beam in a vertical plane between stored and deployed states.

2. The apparatus of claim 1 further provided with a hydraulic pump for servicing said hydraulically activated piston means, said pump being housed within said base member.

3. The apparatus of claim 1 wherein the nature of the engagement of said forward lifting beam with said first pivot means is such as to enable said beam to be upwardly raised at angles up to about 30 degrees with respect to said base member.

4. The apparatus of claim 1 wherein said forward lifting beam is of straight configuration.

5. The apparatus of claim 1 having a centered plane of symmetry.

6. The apparatus of claim 1 wherein securing apertures are disposed in said beams at locations which are on a circular arc centered upon said second pivot means.

7. The apparatus of claim 1 further provided with first embracing plates attached to said forward lifting beam adjacent said distal extremity and directed upwardly therefrom.

8. The apparatus of claim 7 wherein said third pivot means is engaged by said first embracing plates at an elevation above said forward lifting beam.

9. The apparatus of claim 1 wherein second embracing plates are secured to said leverage post adjacent the upper extremity thereof.

10. The apparatus of claim 9 wherein said fourth pivot means are secured by said second embracing plates.

11. The apparatus of claim 1 wherein the effect of said second pivot means is to enable said rear lifting beam to swing in a vertical path between stored and deployed states.

12. The apparatus of claim 1 wherein the distance between said third and fourth pivot means represents a radius of movement of said rear lifting beam.

13. The apparatus of claim 12 wherein said third pivot means is located below said radius line in the stored state of said rear lifting beam.

* * * * *